(12) United States Patent
Homma et al.

(10) Patent No.: US 7,681,161 B2
(45) Date of Patent: Mar. 16, 2010

(54) CIRCUIT DELAY ANALYZER, CIRCUIT DELAY ANALYZING METHOD, AND COMPUTER PRODUCT

(75) Inventors: Katsumi Homma, Kawasaki (JP); Hidetoshi Matsuoka, Kawasaki (JP); Izumi Nitta, Kawasaki (JP); Toshiyuki Shibuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 11/902,489

(22) Filed: Sep. 21, 2007

(65) Prior Publication Data

US 2008/0148205 A1    Jun. 19, 2008

(30) Foreign Application Priority Data

Dec. 19, 2006  (JP) .............................. 2006-341828

(51) Int. Cl.
  *G06F 17/50* (2006.01)
(52) U.S. Cl. ..................... 716/6; 716/4; 716/5
(58) Field of Classification Search ............ 716/6, 716/4, 5
  See application file for complete search history.

(56) References Cited

U.S. PATENT DOCUMENTS 5,933,433 A * 8/1999 Miyashita ................... 370/508

2006/0107244 A1 * 5/2006 Yonezawa ..................... 716/4

FOREIGN PATENT DOCUMENTS

JP    2005-100310    4/2005

* cited by examiner

*Primary Examiner*—Sun J Lin
(74) *Attorney, Agent, or Firm*—Fujitsu Patent Center

(57) ABSTRACT

Delay analysis performed on a circuit having multiple parallel partial circuits (paths) involves recursively integrating two paths of the circuit using an all-element delay distribution that indicates delay based on performance of all circuit elements in a path and a correlation delay distribution that indicates delay based on correlation between circuit elements in the path. An all-element delay distribution is calculated for the integrated path using the all-element delay distributions of the two paths to be integrated. The all-element delay distributions and the correlation delay distributions of two paths to be integrated are used to calculate a total delay distribution for the integrated path. The total delay distribution is used with the all-element delay distribution for the integrated path to calculate a correlation delay distribution for the integrated path. Through recursive calculation, a delay distribution of the circuit is estimated.

9 Claims, 7 Drawing Sheets

CIRCUIT DELAY ANALYZER, CIRCUIT DELAY ANALYZING METHOD, AND COMPUTER PRODUCT

CROSS-REFERENCE TO RELATED APPLICATIONS

This application is based upon and claims the benefit of priority from the prior Japanese Patent Application No. 2006-341828, filed on Dec. 19, 2006, the entire contents of which are incorporated herein by reference.

BACKGROUND OF THE INVENTION

1. Field of the Invention

The present invention relates to a delay analyzer, a delay analyzing method, and computer product for estimating circuit delay.

2. Description of the Related Art

In recent years, the effect of statistical factors, such as process dispersion, power voltage drop, and crosstalk, on a semiconductor integrated circuit have increased as the size of the semiconductor integrated circuit has decreased, leading to an increase in circuit delay fluctuations. Conventional static delay analysis (static timing analysis (STA)) makes allowances for these circuit delay fluctuations as delay margins, but increasing delay margins make timing design difficult.

Under the circumstances, demand for statistical delay analysis (statistical static timing analysis (SSTA)) has been growing. The statistical delay analysis enables a reduction in unnecessary delay margins by precisely taking statistical factors into consideration. Statistical factors processed through SSTA include dispersion components independent between circuit elements and wires of a semiconductor integrated circuit, and dispersion components correlated between the circuit elements and wires.

Determining an exact delay distribution of the entire circuit through SSTA requires consideration of these dispersion components. For example, Monte Carlo simulation is one method for calculating an exact delay distribution of the entire circuit through consideration of dispersion components.

According to another proposed method, the components of relative dispersion of delay times resulting from opposite paths in an analysis subject circuit are divided into systematic components and random components, and a delay distribution of the entire circuit is calculated approximately using the systematic components and random components (e.g., see Japanese Patent Application Laid-Open Publication No. 2005-100310).

The Monte Carlo simulation, which is a conventional technique, however, requires an enormous amount of calculations to determine a delay distribution derived through precise consideration of dispersion factors. This method, therefore, requires greater work time for delay analysis, leading to a longer design period.

The conventional technique disclosed in Japanese Patent Application Laid-Open Publication No. 2005-100310 estimates statistical factors at worst values, thus giving a calculated delay distribution that is substantially pessimistic and inaccurate. As a result, review work in the course of circuit design becomes necessary, which increases burden on a designer and extends a design period.

SUMMARY OF THE INVENTION

It is an object of the present invention to at least solve the above problems in the conventional technologies.

A computer-readable recording medium according to one aspect of the present invention stores therein a computer program for performing circuit delay analysis on a subject using an all-element delay distribution and a correlation delay distribution, the all-element delay distribution indicating delay based on performance of all circuit elements in a path, the correlation delay distribution indicating delay based on correlation between circuit elements in the path, and the computer program causing a computer to execute extracting, from a data set including the all-element delay distributions and the correlation delay distributions of paths in the subject, a first all-element delay distribution and a first correlation delay distribution of a first path among the paths and a second all-element delay distribution and a second correlation delay distribution of a second path among the paths; calculating a total delay distribution representing a total delay of an integrated path formed by combining the first path and the second path, based on the first all-element delay distribution, the first correlation delay distribution, the second all element delay distribution, and the second correlation delay distribution; calculating a third all-element delay distribution of the integrated path based on the first all-element delay distribution and the second all-element delay distribution; and calculating a third correlation delay distribution of the integrated path based on the total delay distribution and the third all-element delay distribution.

An apparatus according to another aspect of the present invention is for performing circuit delay analysis on a subject using an all-element delay distribution and a correlation delay distribution, the all-element delay distribution indicating delay based on performance of all circuit elements in a path, the correlation delay distribution indicating delay based on correlation between circuit elements in the path, and the apparatus includes an extracting unit that, from a data set including the all-element delay distributions and the correlation delay distributions of paths in the subject, extracts a first all-element delay distribution and a first correlation delay distribution of a first path among the paths and a second all-element delay distribution and a second correlation delay distribution of a second path among the paths; a first calculating unit that calculates a total delay distribution representing a total delay of an integrated path formed by combining the first path and the second path, based on the first all-element delay distribution, the first correlation delay distribution, the second all element delay distribution, and the second correlation delay distribution; a second calculating unit that calculates a third all-element delay distribution of the integrated path based on the first all-element delay distribution and the second all-element delay distribution; and a third calculating unit that calculates a third correlation delay distribution of the integrated path based on the total delay distribution and the third all-element delay distribution.

A method according to still another aspect of the present invention is for performing circuit delay analysis on a subject using an all-element delay distribution and a correlation delay distribution, the all-element delay distribution indicating delay based on performance of all circuit elements in a path, the correlation delay distribution indicating delay based on correlation between circuit elements in the path, and the method includes extracting, from a data set including the all-element delay distributions and the correlation delay distributions of paths in the subject, a first all-element delay distribution and a first correlation delay distribution of a first path among the paths and a second all-element delay distribution and a second correlation delay distribution of a second path among the paths; calculating a total delay distribution representing a total delay of an integrated path formed by combining the first path and the second path, based on the first all-element delay distribution, the first correlation delay distribution, the second all element delay distribution, and the second correlation delay distribution; calculating a third all-element delay distribution of the integrated path based on the first all-element delay distribution and the second all-element delay distribution; and calculating a third correlation delay distribution of the integrated path based on the total delay distribution and the third all-element delay distribution.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
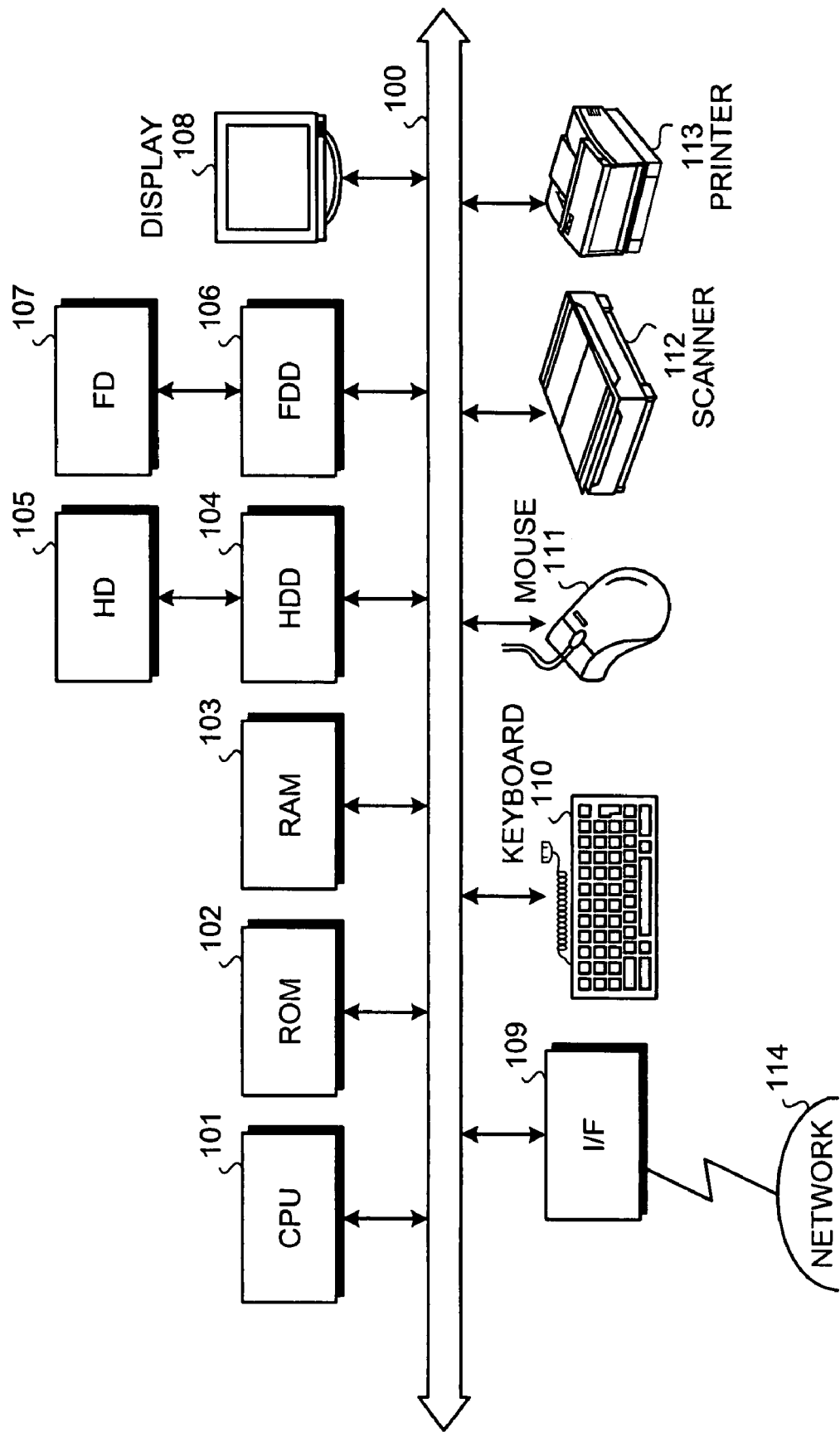
FIG. 1 is a diagram of a delay analyzer according to an embodiment of the present invention.

FIG. 1 is a diagram of a delay analyzer according to an embodiment of the present invention.

As shown in FIG. 1, the delay analyzer includes a central processing unit (CPU) 101, a read-only memory (ROM) 102, a ROM 103, a hard disk drive (HDD) 104, a hard disk (HD) 105, a flexible disk drive (FDD) 106, a flexible disk (FD) 107 (an example of a removable recording medium), a display 108, an interface (I/F) 109, a keyboard 110, a mouse 111, a scanner 112, and a printer 113. These components are interconnected via a bus 100.

The CPU 101 governs control over the entire part of the delay analyzer. The ROM 102 stores programs including a boot program. The RAM 103 is used as a work area for the CPU 101. The HDD 104 follows control by the CPU 101 to control data reading and writing on the HD 105. The HD 105 stores data written thereon under control by the HDD 104.

The FDD 106 under the control of the CPU 101 controls data reading and writing on the FD 107. The FD 107 stores data written thereon under the control of the FDD 106, and allows the delay analyzer to read data stored in the FD 107.

The FD 107 serving as a removable recording medium may be replaced with a compact disk read-only memory (CD-ROM) (compact disk-recordable (CD-R), compact disk rewriteable (CD-RW), magneto optical disk (MO), a digital versatile disk DVD, memory card, etc. The display 108 displays a cursor, icons, tool boxes, and data such as documents, images, and function information. For example, a cathode ray tube (CRT), thin-film transistor (TFT) crystal display, or plasma display can be employed as the display 108.

The I/F 109 is connected to a network 114, such as the Internet, via a communication line, and is connected to an external device via the network 114. The I/F 109 assumes control over the network 114 and internal interfaces to control data input and output to and from the external device. For example, a modem or LAN adaptor can be employed as the I/F 109.

The keyboard 110, serving for data input, has keys for entering characters, numerals, various instructions, etc. The keyboard 110 may be replaced with a touch-panel or a numeric keypad. The mouse 111 is used for moving a cursor, selecting a range, moving a window, changing a window size, etc. The mouse 111 may be replaced with another pointing device having the same function as the mouse 111, such as a track ball, joy stick, etc.

The scanner 112 reads an image optically, taking the image into the delay analyzer. The scanner 112 may be provided with an optical character recognition (OCR) function. The printer 113 prints out image data and text. For example, a laser printer or ink jet printer can be employed as the printer 113.

Figure 2:
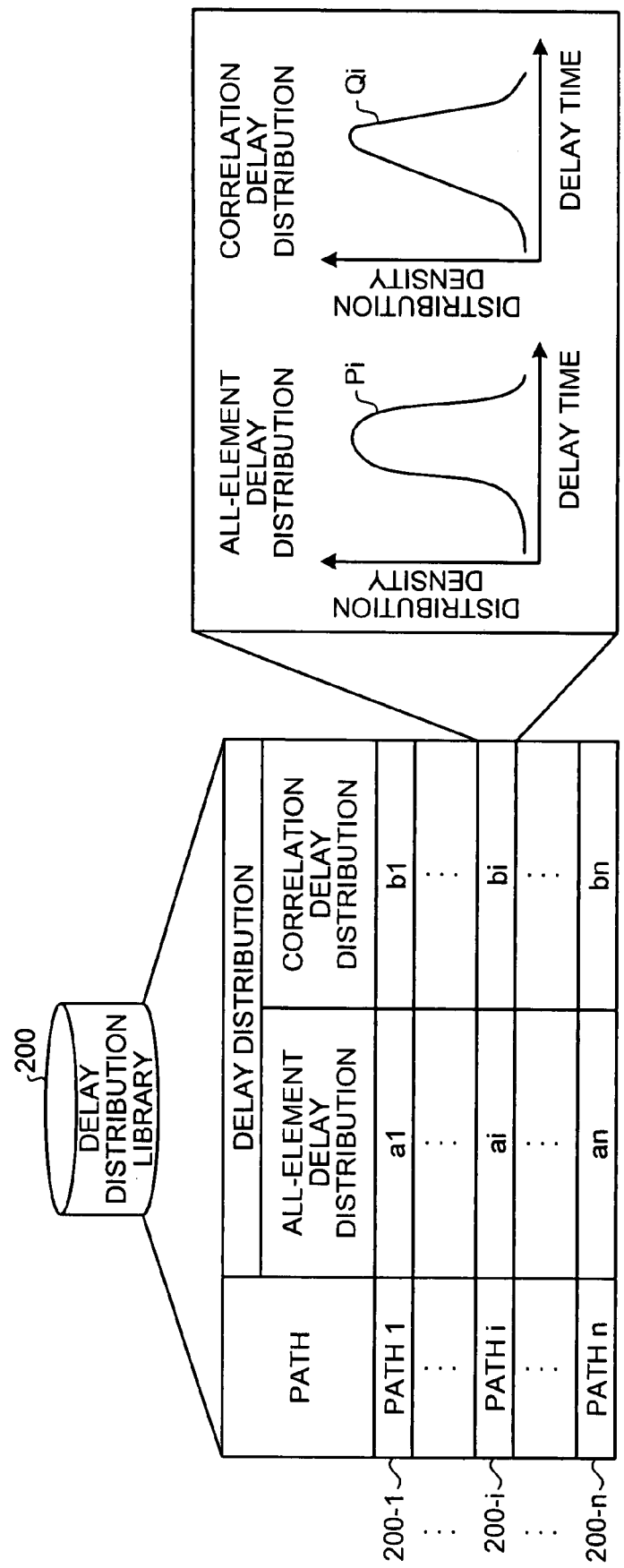
FIG. 2 is a schematic of a delay distribution library.

FIG. 2 is a schematic of the memory contents of a delay distribution library 200. In FIG. 2, the delay distribution library 200 stores delay distribution data 200-1 to 200-$n$ each of which is data on each path (partial circuit) in an analysis subject circuit. Each piece of the delay distribution data 200-1 to 200-$n$ has circuit delay related delay distributions for each path.

The delay distributions for each path consist of an all-element delay distribution and a correlation delay distribution, which will be described in detail later.

For a path i, for example, the delay distribution library 200 has an all-element delay distribution ai and a correlation delay distribution bi. A delay distribution function representing the all-element delay distribution ai is a probability density function Pi, and a delay distribution function representing the correlation delay distribution bi is a probability density function Qi. All-element delay distributions a1 to an and correlation delay distributions b1 to bn for respective paths can be calculated, for example, by a known technique of SSTA.

Figure 3:
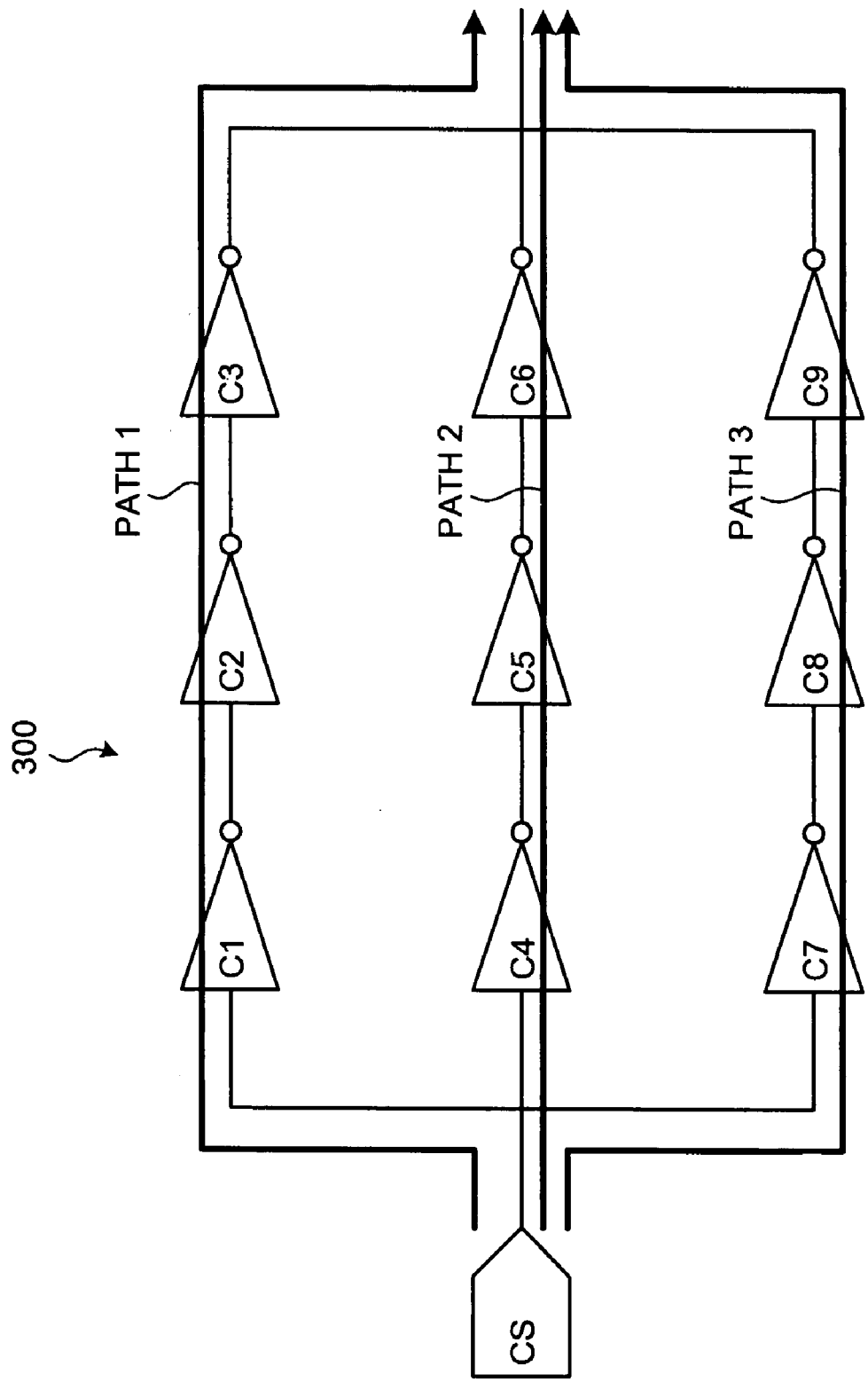
FIG. 3 is a circuit diagram of an analysis subject circuit.

FIG. 3 is a circuit diagram of an analysis subject circuit 300 according to the embodiment of the present invention. FIG. 3 depicts an excerpt of a part of the analysis subject circuit. As shown in FIG. 3, the analysis subject circuit 300 has circuit elements C1 to C9.

In FIG. 3, a path 1 represents a route (path) passing through the circuit elements C1, C2, and C3, a path 2 represents a route (path) passing through the circuit elements C4, C5, and C6, and a path 3 represents a route (path) passing through the circuit elements C7, C8, and C9. The circuit elements include flip-flops, buffers, and inverters. A clock source CS is a clock transmitter employing a crystal, ceramic oscillator, etc.

Figure 4:
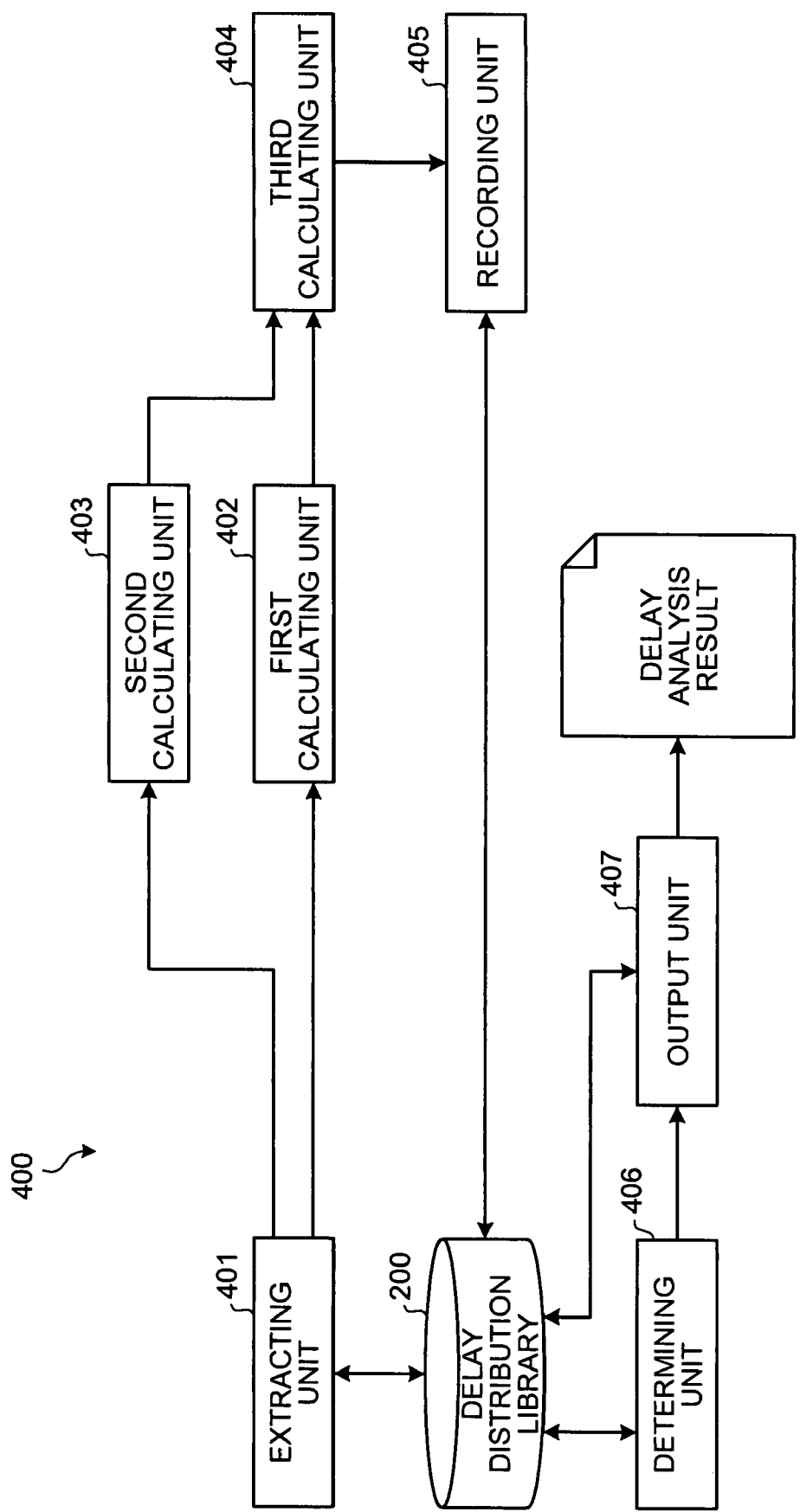
FIG. 4 is a block diagram of the delay analyzer.

FIG. 4 is a block diagram of a functional configuration of the delay analyzer 400 according to the embodiment of the present invention. As shown in FIG. 4, the delay analyzer 400 includes an extracting unit 401, a first calculating unit 402, a second calculating unit 403, a third calculating unit 404, a recording unit 405, a determining unit 406, and an output unit 407.

The delay analyzer 400 analyzes delay in the analysis subject circuit using a delay distribution that indicates delay based on the performance of all the circuit elements in a path (hereinafter "all-element delay distribution"), and a delay distribution that indicates a delay based on the correlation between circuit elements in the path (hereinafter "correlation delay distribution").

An all-element delay distribution statistically represents circuit delay of all the circuit elements in a path with consideration of element performance dispersion components each independent for each circuit element in the path. A correlation delay distribution statistically represents circuit delay in a path with consideration of dispersion components based on the correlation between circuit elements in the path.

An all-element delay distribution and correlation delay distribution of each path in the analysis subject circuit can be obtained by timing analysis. Specifically, for example, a known SSTA technique enables calculation of the all-element delay distribution and correlation delay distribution of each path using a net list data on the analysis subject circuit and dispersion data indicating delay dispersion in each circuit element and wire in the analysis subject circuit.

The result obtained by the timing analysis, that is, data on the all-element delay distribution and correlation delay distribution of each path in the analysis subject circuit is stored in the delay distribution library 200 incorporated in the delay analyzer 400. Specifically, for example, the timing analysis result is stored automatically in the delay distribution library 200 when input to the delay analyzer 400.

The extracting unit 401 extracts all-element delay distributions and correlation delay distributions of any two paths in the analysis subject circuit from a delay distribution set that includes the all-element delay distribution and correlation delay distribution of each path in the analysis subject circuit. The all-element delay distributions and correlation delay distributions of any two paths, which are extracted by the extracting unit 401, are stored in such memories as ROM 102 and RAM 103.

The delay distribution set is a set of all-element delay distributions and correlation delay distributions of all paths in the analysis subject circuit, and is stored in the delay distribution library 200 shown in FIG. 2.

Specifically, the extracting unit 401 extracts delay distribution data on any two paths from the delay distribution library 200, which stores the all-element delay distribution and correlation delay distribution of each path in the analysis subject circuit 300.

More specifically, for example, the extracting unit 401 may extract delay distribution data 200-1 and 200-2 on paths 1 and 2 in increasing order out of the delay distribution data 200-1 to 200-$n$ stored in the delay distribution library 200.

The first calculating unit 402 calculates a delay distribution representing a total delay resulting from the integration of the two paths into one path (hereinafter "in-path total delay distribution"). This calculation is based on the all-element delay distribution and correlation delay distribution of one path extracted by the extracting unit 401, and on the all-element delay distribution and correlation delay distribution of the other path extracted by the extracting unit 401.

Specifically, the first calculating unit 402 reads the all-element delay distributions and correlation delay distributions of the two paths out of such memories as ROM 102 and RAM 103, and calculates the in-path total delay distribution representing the total delay resulting from the integration of the two paths into one path. The in-path total delay distribution calculated by the first calculating unit 402 is stored in such memories as ROM 102 and RAM 103.

Figure 5:
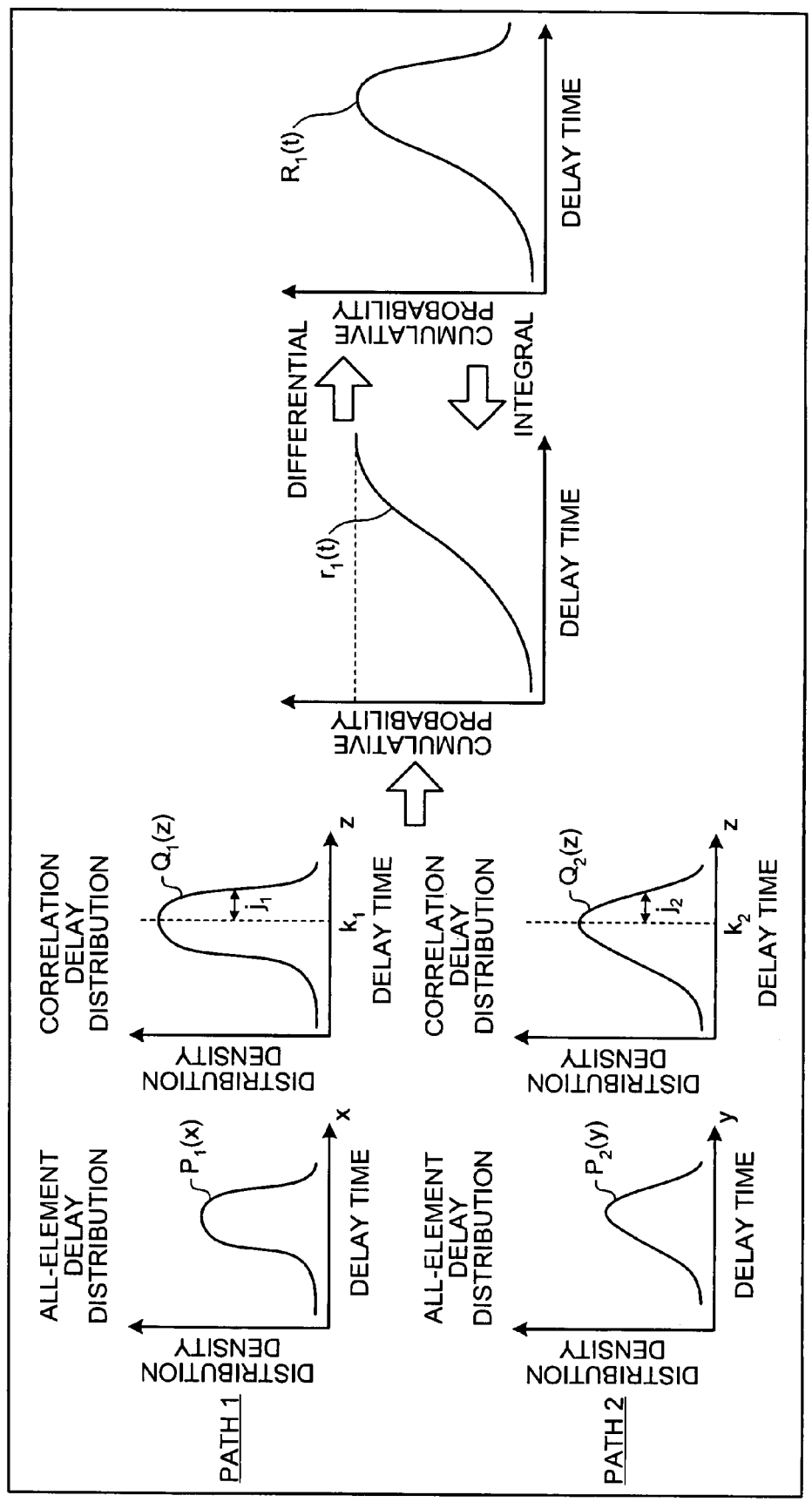
FIG. 5 is a schematic outlining an in-path total delay distribution calculation procedure.

FIG. 5 is a schematic outlining an in-path total delay distribution calculation procedure. Here, the delay distribution data 200-1 and 200-2 on the paths 1 and 2 stored in the delay distribution library 200 are taken to be example data for calculating the in-path total delay distribution.

In the following description, $P_1(x)$ denotes a probability density distribution that is given by expressing an all-element delay distribution a1 of the path 1 in the form of a probability density function, and $Q_1(z)$ denotes a probability density distribution that is given by expressing a correlation delay distribution b1 of the path 1 in the form of a probability density function. $P_2(y)$ denotes a probability density distribution that is given by expressing an all-element delay distribution a2 of the path 2 in the form of a probability density function, and $Q_2(z)$ denotes a probability density distribution that is given by expressing a correlation delay distribution b2 of the path 2 in the form of a probability density function.

Likewise, $R_1(t)$ denotes a probability density distribution that is given by expressing an in-path total delay distribution, which represents a total delay resulting from the integration of the paths 1 and 2 shown in FIG. 3 into one path (hereinafter "in-path total delay distribution c1"), in the form of a probability density function. The correlation delay distributions b1 and b2 have such characteristics that the distribution densities fluctuate in probability on the same chip on the basis of a common probability variable.

Specifically, the probability density functions of the correlation delay distributions b1 and b2 are defined by the following equations (1) and (2), using constants j and k given for each circuit element and a probability variable n(z) given in common to all circuit elements on the same chip.

$$Q_1(z) = j_1 \times n(z) + k_1 \quad (1)$$

$$Q_2(z) = j_2 \times n(z) + k_2 \quad (2)$$

In the equations, $j_1$ and $j_2$ denote standard deviations, and constants $k_1$ and $k_2$ denote averages. The probability variable n(z) common to the equations (1) and (2) represents a normal distribution with factors of "average: 1" and "standard deviation: 1", and is defined by the following equation (3).

$$n(z) = \frac{1}{\sqrt{2\pi}} \cdot e^{-\frac{z^2}{2}} \quad (3)$$

FIG. 5 shows the probability density distribution $P_1(x)$ of the all-element delay distribution a1 on the path 1 extracted by the extracting unit 401, and the probability density distribution $Q_1(z)$ of the correlation delay distribution b1 on the path 1 extracted by the extracting unit 401. FIG. 5 also shows the probability density distribution $P_2(y)$ of the all-element delay distribution a2 on the path 2 extracted by the extracting unit 401, and the probability density distribution $Q_2(z)$ of the correlation delay distribution b2 on the path 2 extracted by the extracting unit 401.

The probability density distribution $R_1(t)$ of the in-path total delay distribution c1, which represents the total delay resulting from the integration of the paths 1 and 2 into one path, is calculated using those probability density distributions $P_1(x)$, $P_2(y)$, $Q_1(z)$, and $Q_2(z)$. Specifically, a cumulative probability distribution on the paths 1 and 2 is determined using the following equation (4).

$$r_1(t) = \iiint P_1(x) P_2(y) n(z) dx dy dz$$

$$\max(x+j_n(z)+k_1, y+j_2 n(z)+k_2) \leq t \quad (4)$$

The cumulative probability distribution $r_1(t)$ determined by the equation (4) is then differentiated to calculate the probability density distribution $R_1(t)$ of the in-path total delay distribution c1 representing the total delay resulting from the integration of the paths 1 and 2 into one path.

The second calculating unit 403 calculates an all-element delay distribution resulting from the integration of the two paths into one path. This calculation is based on the all-element delay distribution of one path extracted by the extracting unit 401, and on the all-element delay distribution of the other path extracted by the extracting unit 401.

Specifically, the second calculating unit 403 reads the all-element delay distribution of each path out of such memories as ROM 102 and RAM 103, and calculates the all-element delay distribution resulting from the integration of the two paths into one path. The all-element delay distribution calculated by the second calculating unit 403 is stored in such memories as ROM 102 and RAM 103.

The all-element delay distribution is represents a circuit delay with consideration of element performance dispersion components each independent for each circuit element in the path. The all-element delay distribution is, therefore, the independent delay distribution for each path. Because of this, for example, the probability density distribution of the all-element delay distribution resulting from the integration of the paths 1 and 2 shown in FIG. 3 into one path (hereinafter "all-element delay distribution d1") is defined by the following equation (5), using a cumulative probability function on the all-element delay distribution of each path ($P_1(x), P_2(y)$). Here, $F_1(t)$ denotes the probability density distribution of the all-element delay distribution d1.

$$F_1(t) = P_1(t) \int_{-\infty}^{t} P_2(y)dy + P_2(t) \int_{-\infty}^{t} P_1(x)dx \quad (5)$$

The third calculating unit 404 calculates a correlation delay distribution resulting from the integration of the two paths into one path. This calculation is based on the in-path total delay distribution calculated by the first calculating unit 402, and on the all-element delay distribution calculated by the second calculating unit 403.

Specifically, the third calculating unit 404 reads the in-path total delay distribution calculated by the first calculating unit 402 and the all-element delay distribution calculated by the second calculating unit 403 out of such memories as ROM 102 and RAM 103, and calculates the correlation delay distribution resulting from the integration of the two paths into one path. The correlation delay distribution resulting from the integration of the two paths into one path, which is calculated by the third calculating unit 404, is stored in such memories as ROM 102 and RAM 103.

More specifically, the third calculating unit 404 calculates the "average M" and "standard deviation Σ" of the probability density distribution $R_1(t)$ of the in-path total delay distribution c1 calculated by the first calculating unit 402. The third calculating unit 404 then calculates the "average m" and "standard deviation σ" of the probability density distribution $F_1(t)$ of the all-element delay distribution d1 calculated by the second calculating unit 403.

The probability density distribution of the correlation delay distribution resulting from the integration of the two paths into one path (hereinafter "correlation delay distribution e1") is defined by the following equations (6), (7), and (8), using the "average M" and "standard deviation Σ" of the probability density distribution $R_1(t)$ and the "average m" and "standard deviation σ" of the probability density distribution $F_1(t)$ Here, $G_1(z)$ denotes the probability density distribution of the correlation delay distribution e1 resulting from the integration of the two paths into one path.

$$G_1(z) = Az + B \quad (6)$$

$$A = \sqrt{\Sigma^2 - \sigma^2} \quad (7)$$

$$B = M - m \quad (8)$$

This mathematical process is carried out utilizing the mathematical properties of probability density distributions. Specifically, the average of a probability density distribution having undergone a convolution process is the sum of the averages of two probability density distributions before the convolution process. In addition, the square of the standard deviation of the probability density distribution having undergone the convolution process is the sum of the squares of the standard deviations of two probability density distributions before the convolution process.

These properties apply to an all-element delay distribution, a correlation delay distribution, and an in-path total delay distribution. In other words, the above mathematical properties apply to a mathematical process of subjecting the all-element delay distribution and correlation delay distribution to a convolution process to determine the in-path total delay distribution.

The recording unit 405 records the all-element delay distribution calculated by the second calculating unit 403 and the correlation delay distribution calculated by the third calculating unit 404 in the delay distribution set in replacement of the all-element delay distributions and correlation delay distributions extracted by the extracting unit 401. The calculated all-element delay distribution and correlation delay distribution are recorded as an all-element delay distribution and correlation delay distribution of one path.

Specifically, for example, the recording unit 405 records a new piece of delay distribution data resulting from the integration of the paths 1 and 2 into one path in the delay distribution library 200 in replacement of the delay distribution data 200-1 and 200-2 on the paths 1 and 2 extracted from the delay distribution library 200.

This means that delay distribution data on two paths are deleted from the delay distribution library 200 to store one new piece of delay distribution data in the delay distribution library 200. This reduces the number of delay distribution data recorded in the delay distribution library 200 by one.

Figure 6:
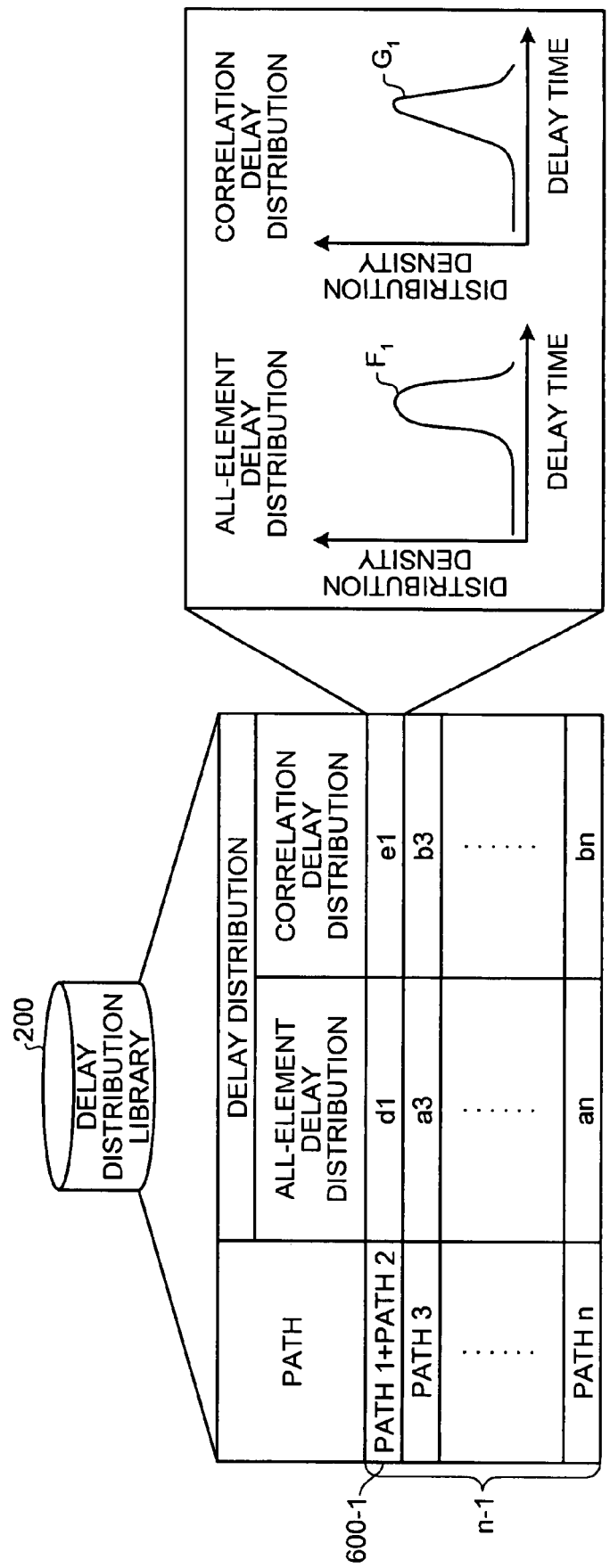
FIG. 6 is a schematic of the memory contents of the delay distribution library.

The memory contents of the delay distribution library 200, which records a new piece of delay distribution data added by the recording unit 405, will then be described. FIG. 6 is a schematic of the memory contents of the delay distribution library 200. As shown in FIG. 6, the delay distribution library 200 stores the piece of delay distribution data 600-1 resulting from the integration of the paths 1 and 2 shown in FIG. 3 into one path.

The delay distribution data 600-1 is the new piece of delay distribution data that is recorded by the recording unit 405 in replacement of the piece of delay distribution data 200-1 on the path 1 (see FIG. 2) and the piece of delay distribution data 200-2 on the path 2 (see FIG. 2).

Recording the new piece of delay distribution data 600-1 in replacement of the delay distribution data 200-1 and 200-2 reduces "n" pieces of delay distribution data stored in the delay distribution library 200, as shown in FIG. 2, into "n−1" pieces of delay distribution data in the delay distribution library 200, as shown in FIG. 6.

This means that every recording of a new piece of delay distribution data in the delay distribution library 200 by the recording unit 405 results in one fewer pieces of delay distribution data stored in the delay distribution library 200.

The determining unit 406 determines whether the delay distribution set includes all-element delay distributions and correlation delay distributions on a plurality of paths. Specifically, the determining unit 406 reads the delay distribution set out of such a memory as HD 105, and determines whether the delay distribution set includes the all-element delay distributions and correlation delay distributions for multiple paths.

More specifically, for example, the determining unit 406 may read header data out of the delay distribution library 200, the header data indicating the number of delay distribution data held in the delay distribution library 200 at that point, and determine whether the delay distribution library 200 holds multiple pieces of delay distribution data. A determination result given by the determining unit 406 is stored in such memories as ROM 102 and RAM 103.

When determining unit 406 determines that the delay distribution set includes the all-element delay distributions and correlation delay distributions for multiple paths, the extracting unit 401 extracts all-element delay distributions and correlation delay distributions of any two paths in the analysis subject circuit from the delay distribution set, which includes the all-element delay distribution calculated by the second calculating unit 403 and the correlation delay distribution calculated by the third calculating unit 404 that are recorded by the recording unit 405.

Specifically, when the determining unit 406 determines that the delay distribution library 200 holds multiple pieces of delay distribution data, the extracting unit 401 extracts any two pieces of delay distribution data out of remaining delay distribution data held in the delay distribution library 200 at that point.

When determining unit 406 determines that the delay distribution set does not include the all-element delay distributions and correlation delay distributions for multiple paths, the output unit 407 outputs the remaining all-element delay distribution and correlation delay distribution included in the delay distribution set as a result of delay analysis on the entire analysis subject circuit.

Subsequently, a path total delay distribution of the analysis subject circuit is calculated from the all-element delay distribution and correlation delay distribution that are output by the output unit 407. Thus, a circuit delay of the analysis subject circuit can be estimated.

Specifically, for example, when the determining unit 406 determines that the delay distribution library 200 does not hold multiple pieces of delay distribution data, the output unit 407 reads the remaining piece of delay distribution data out of the delay distribution library 200, and outputs the delay distribution data as a result of delay analysis on the entire analysis subject circuit.

In other words, when one piece of delay distribution data remains held in the delay distribution library 200, the output unit 407 reads the remaining piece of delay distribution data, which is the delay distribution data resulting from the integration of all paths in the analysis subject circuit into one path, out of the delay distribution library 200, and outputs the delay distribution data as a result of delay analysis on the entire analysis subject circuit.

The above extracting unit 401, first calculating unit 402, second calculating unit 403, third calculating unit 404, recording unit 405, determining unit 406, and output unit 407 realize their functions, for example, as the CPU 101 executes a program recorded on such a computer-readable recoding medium as ROM 102, RAM 103, and HD 105 shown in FIG. 1, or as the I/F 109 operates.

Figure 7:
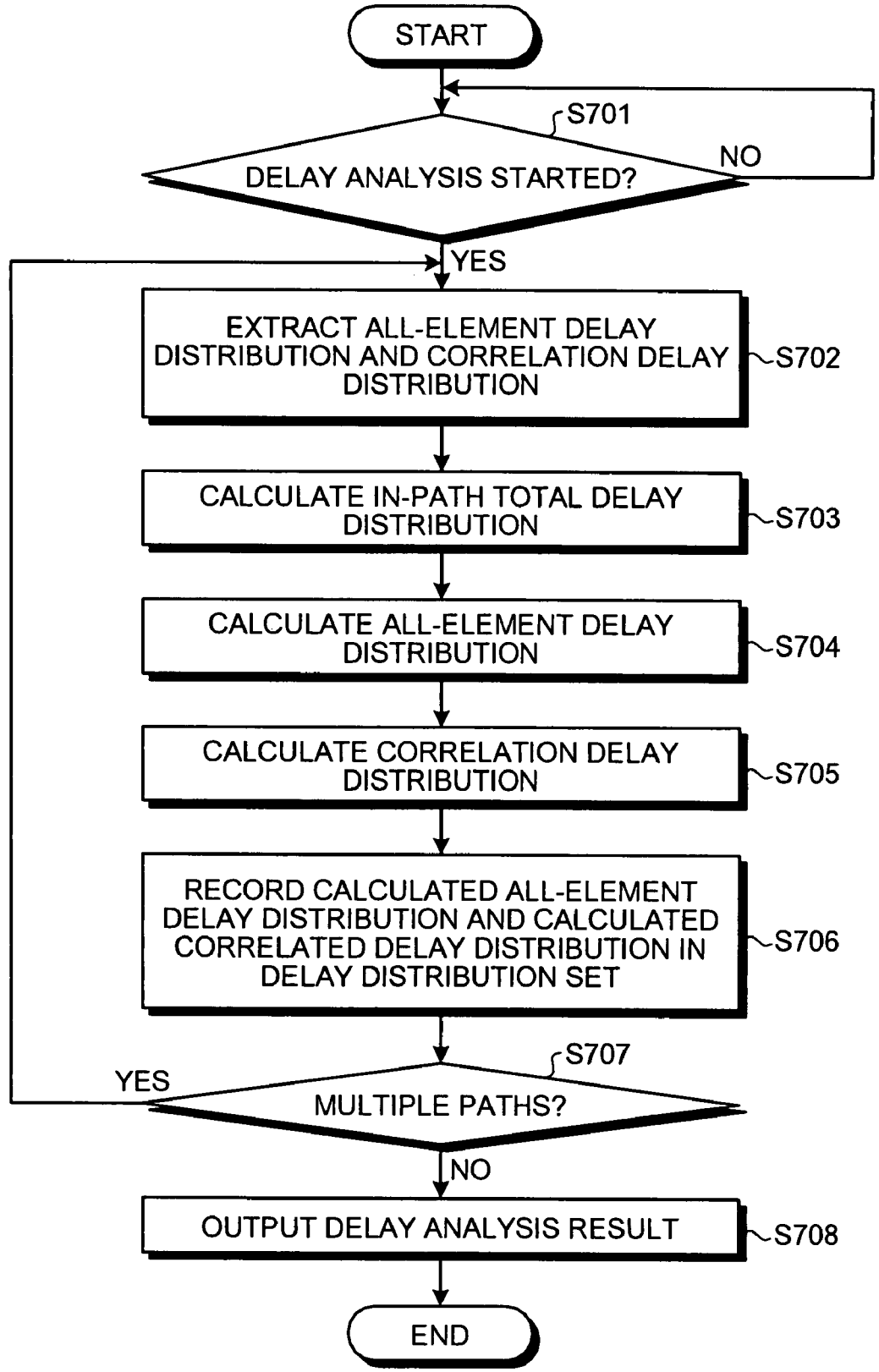
FIG. 7 is a flowchart of a delay analyzing procedure executed by the delay analyzer.

FIG. 7 is a flowchart of a delay analyzing procedure executed by the delay analyzer 400 according to the embodiment of the present invention.

At the start of the flowchart shown in FIG. 7, the delay analyzer 400 determines whether a delay analysis on an analysis subject circuit has started (step S701). Specifically, for example, the delay analyzer 400 determines whether the delay analyzer 400 has received input of a user instruction on the start of a delay analysis on the analysis subject circuit.

The delay analyzer 400 waits for the start of delay analysis on the analysis subject circuit, and, when the delay analysis has started (step S701: YES), the extracting unit 401 extracts all-element delay distributions and correlation delay distributions of any two paths in the analysis subject circuit from a delay distribution set (step S702).

Then, the first calculating unit 402 calculates an in-path total delay distribution that represents a total delay resulting from the integration of the two paths into one path (step S703). This calculation is based on the all-element delay distribution and correlation delay distribution of one path extracted at step S702, and on the all-element delay distribution and correlation delay distribution of the other path extracted at step S702.

The second calculating unit 403 calculates an all-element delay distribution resulting from the integration of the two paths into one path (step S704). This calculation is based on the all-element delay distribution of one path extracted at step S702, and on the all-element delay distribution of the other path extracted at step S702.

The third calculating unit 404 then calculates a correlation delay distribution resulting from the integration of the two paths into one path (step S705). This calculation is based on the in-path total delay distribution calculated at step S703, and on the all-element delay distribution calculated at step S704.

The recording unit 405 records the all-element delay distribution calculated at step S704 and the correlation delay distribution calculated at step S705 in the delay distribution set in replacement of the all-element delay distributions and correlation delay distributions extracted at step S702. The calculated all-element delay distribution and correlation delay distribution are recorded as an all-element delay distribution and correlation delay distribution of one path (step S706).

Following step S706, the determining unit 406 determines whether the delay distribution set includes all-element delay distributions and correlation delay distributions for multiple paths (step S707).

When determining unit 406 determines that the delay distribution set includes the all-element delay distributions and correlation delay distributions for multiple paths (step S707: YES), the procedure proceeds to step S702, from which a series of steps are repeated.

When determining unit 406 determines that the delay distribution set does not include the all-element delay distributions and correlation delay distributions for multiple paths (step S707: NO), the output unit 407 outputs the remaining all-element delay distribution and correlation delay distribution included in the delay distribution set as a result of delay analysis on the entire analysis subject circuit (step S708), at which the series of steps according to the flowchart comes to an end.

The processes executed at steps S703 and S704 may be executed in reverse order, or may be executed in parallel steps.

According to the embodiment of the present invention, an all-element delay distribution and an all-element delay distribution resulting from the integration of two paths into one path can be calculated reflexively from an all-element delay distribution and a correlation delay distribution of each path in an analysis subject circuit.

This allows automatic calculation of an all-element delay distribution and an all-element delay distribution resulting from the integration of all paths in the analysis subject circuit into one path. From the calculated all-element delay distribution and all-element delay distribution, an in-path total delay distribution of the entire analysis subject circuit can be calculated to allow a precise estimation of a circuit delay of the analysis subject circuit.

The present invention makes calculation processes simpler, thus making calculation faster in comparison with a case where a delay analysis is made according to the Monte Carlo method under consideration of an in-path all-element delay and an in-path correlated-element delay in the analysis subject circuit.

As described above, according to the delay analyzing program, the recording medium recording the program, the delay analyzer, and the delay analyzing method, burden on a designer and a design period can be reduced through efficient and precise execution of a delay analysis on an analysis subject circuit.

The delay analyzing method described in the present embodiment can be carried out by causing a computer, such as personal computer or work station, to execute a prepared program. This program is recorded on a computer-readable recording medium of hard disk, flexible disk, CD-ROM, MO, DVD, etc., and is executed as the computer reads the program out of the recording medium. The program may be a transmittable medium that can be distributed via a network, such as the Internet.

The embodiments enable a reduction in burden on a designer and in a design period through efficient and precise execution of a delay analysis on an analysis subject circuit.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium storing therein a computer program for performing circuit delay analysis on a semiconductor integrated circuit using an all-element delay distribution and a correlation delay distribution, the all-element delay distribution indicating delay based on performance of all circuit elements in a path, the correlation delay distribution indicating delay based on correlation between circuit elements in the path, the computer program causing a computer to execute:

extracting, from a data set including the all-element delay distributions and the correlation delay distributions of paths in the semiconductor integrated circuit, a first all-element delay distribution and a first correlation delay distribution of a first path among the paths and a second all-element delay distribution and a second correlation delay distribution of a second path among the paths that is parallel to the first path;

calculating a total delay distribution representing a total delay of an integrated path formed by combining the first path and the second path, based on the first all-element delay distribution, the first correlation delay distribution, the second all-element delay distribution, and the second correlation delay distribution;

calculating a third all-element delay distribution of the integrated path based on the first all-element delay distribution and the second all-element delay distribution; and calculating a third correlation delay distribution of the integrated path based on the total delay distribution and the third all-element delay distribution.

2. The computer-readable recording medium according to claim 1, wherein the computer program further causes the computer to execute:

recording the third all-element delay distribution and the third correlation delay distribution in the data set in replacement of the first all-element delay distribution, the first correlation delay distribution, the second all-element delay distribution, and the second correlation delay distribution, as an all-element delay distribution and a correlation delay distribution of a single path; and determining whether the data set includes the all-element delay distribution and the correlation delay distribution of more than one path, wherein the extracting, the calculating a total delay distribution, the calculating a third all-element delay distribution, and the calculating a third correlation delay distribution are executed based on a result of determination at the determining.

3. The computer-readable recording medium according to claim 2, wherein the computer program further causes the computer to execute:

outputting, when it is determined that the data set includes the all-element delay distribution and the correlation delay distribution of only one path, the all-element delay distribution and the correlation delay distribution in the data set as a result of the circuit delay analysis.

4. An apparatus for performing circuit delay analysis on a semiconductor integrated circuit using an all-element delay distribution and a correlation delay distribution, the all-element delay distribution indicating delay based on performance of all circuit elements in a path, the correlation delay distribution indicating delay based on correlation between circuit elements in the path, the apparatus comprising:

an extracting unit that, from a data set including the all-element delay distributions and the correlation delay distributions of paths in the semiconductor integrated circuit, extracts a first all-element delay distribution and a first correlation delay distribution of a first path among the paths and a second all-element delay distribution and a second correlation delay distribution of a second path among the paths that is parallel to the first path;

a first calculating unit that calculates a total delay distribution representing a total delay of an integrated path formed by combining the first path and the second path, based on the first all-element delay distribution, the first correlation delay distribution, the second all-element delay distribution, and the second correlation delay distribution;

a second calculating unit that calculates a third all-element delay distribution of the integrated path based on the first all-element delay distribution and the second all-element delay distribution; and a third calculating unit that calculates a third correlation delay distribution of the integrated path based on the total delay distribution and the third all-element delay distribution.

5. The apparatus according to claim 4, further comprising:

a recording unit that records the third all-element delay distribution and the third correlation delay distribution in the data set in replacement of the first all-element delay distribution, the first correlation delay distribution, the second all-element delay distribution, and the second correlation delay distribution, as an all-element delay distribution and a correlation delay distribution of a single path; and a determining unit that determines whether the data set includes the all-element delay distribution and the correlation delay distribution of more than one path, wherein the extracting unit extracts the all-element delay distribution and the correlation delay distribution of any two paths among the paths, based on determination made by the determining unit.

6. The apparatus according to claim 5, further comprising:

an output unit that, when it is determined that the data set includes the all-element delay distribution and the correlation delay distribution of only one path, outputs the all-element delay distribution and the correlation delay distribution in the data set as a result of the circuit delay analysis.

7. A method of performing circuit delay analysis on a semiconductor integrated circuit using an all-element delay distribution and a correlation delay distribution, the all-element delay distribution indicating delay based on performance of all circuit elements in a path, the correlation delay distribution indicating delay based on correlation between circuit elements in the path, the method comprising:

extracting, from a data set including the all-element delay distributions and the correlation delay distributions of paths in the semiconductor integrated circuit, a first all-element delay distribution and a first correlation delay distribution of a first path among the paths and a second all-element delay distribution and a second correlation delay distribution of a second path among the paths that is parallel to the first path;

calculating a total delay distribution representing a total delay of an integrated path formed by combining the first path and the second path, based on the first all-element delay distribution, the first correlation delay distribution, the second all-element delay distribution, and the second correlation delay distribution;

calculating a third all-element delay distribution of the integrated path based on the first all-element delay distribution and the second all-element delay distribution; and calculating, using a microprocessor of a computer, a third correlation delay distribution of the integrated path based on the total delay distribution and the third all-element delay distribution.

8. The method according to claim 7, further comprising:

recording the third all-element delay distribution and the third correlation delay distribution in the data set in replacement of the first all-element delay distribution, the first correlation delay distribution, the second all-element delay distribution, and the second correlation delay distribution, as an all-element delay distribution and a correlation delay distribution of a single path; and determining whether the data set includes the all-element delay distribution and the correlation delay distribution of more than one path, wherein the extracting, the calculating a total delay distribution, the calculating a third all-element delay distribution, and the calculating a third correlation delay distribution are executed based on a result of determination at the determining.

9. The method according to claim 8, further comprising:

outputting, when it is determined that the data set includes the all-element delay distribution and the correlation delay distribution of only one path, the all-element delay distribution and the correlation delay distribution in the data set as a result of the circuit delay analysis.

* * * * *